Sept. 15, 1970

G. RIDDELL 3,529,090

SCANNING EQUIPMENT

Filed March 24, 1966

2 Sheets-Sheet 1

United States Patent Office 3,529,090
Patented Sept. 15, 1970

3,529,090

SCANNING EQUIPMENT

George Riddell, Lincroft, N.J., assignor to Bell Telephone Laboratories, Incorporated, New York, N.Y., a corporation of New York Filed Mar. 24, 1966, Ser. No. 537,224
Int. Cl. H04q 3/18
U.S. Cl. 179—18 17 Claims

ABSTRACT OF THE DISCLOSURE

A pair of free running scanners are disclosed for scanning the potential state of the common group of terminals. The first scanner to reach an energized terminal stops and transmits information to a system controller identifying the terminal. A stopped scanner remains at a terminal and does not resume active scanning until it receives a signal indicating that the transmitted information has been satisfactorily received by the controller. Circuitry is provided to prevent both scanners from concurrently stopping on the same terminal.

Figure 1:
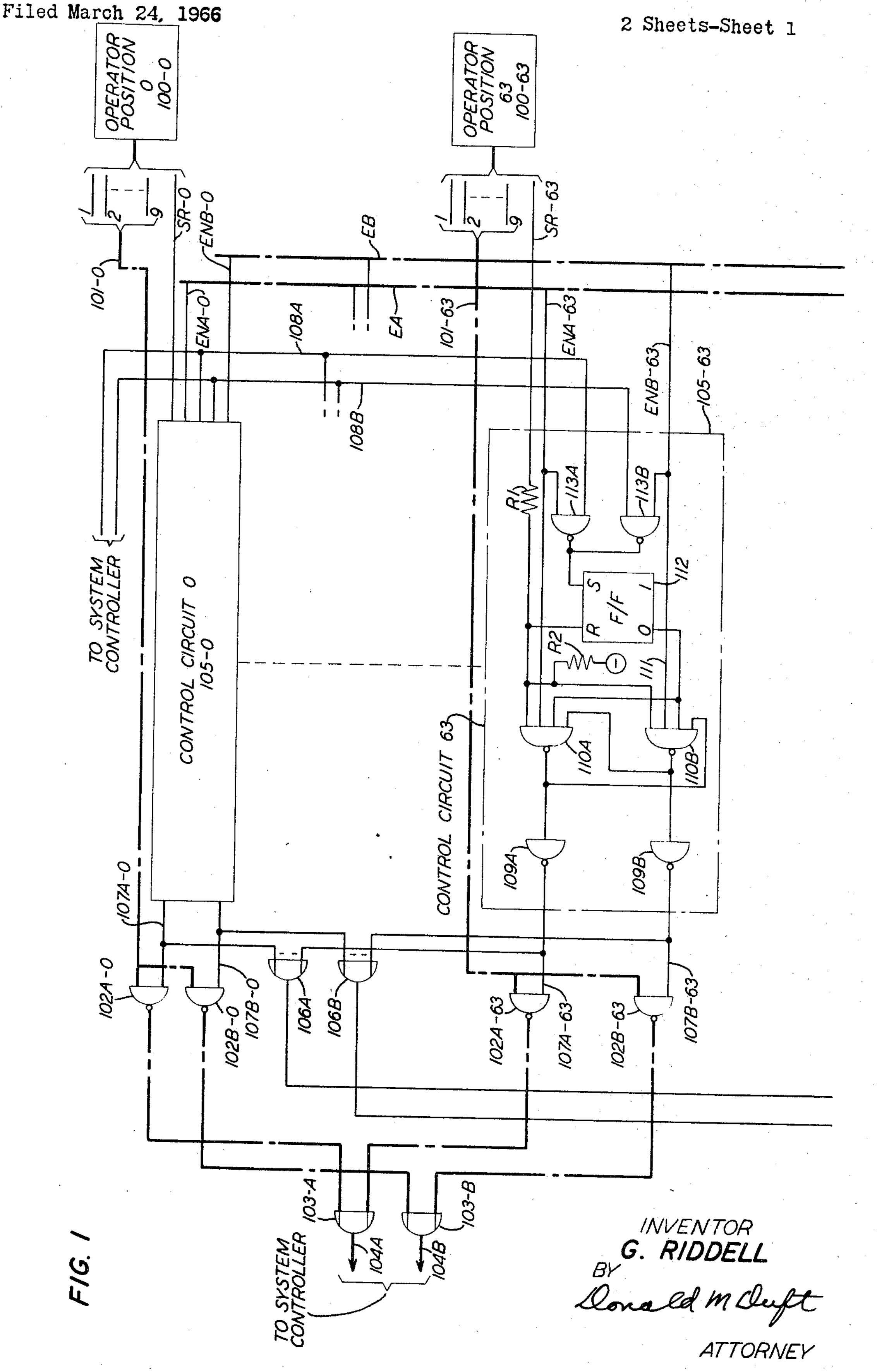

This invention relates to scanning equipment, and more particularly to equipment which utilizes a plurality of scanners for monitoring the state of a group of terminals common to all scanners.

Scanners are commonly utilized in electronic systems to monitor the electrical state of terminals and to transmit information to a system controller upon the detection of a change of state of any terminal. Each terminal may be individual to a discrete circuit or circuit point of the system and each such change of state may represent a condition requiring action on the part of the controller. Each terminal may typically have two different potentials applied to it, one at a time, to permit it to represent two different states or system conditions. One potential may represent a normal condition for which no action is required. The other potential may represent a condition requiring action by the controller. These two potentials and the state associated therewith are hereinafter referred to as "idle" and "busy," respectively.

A scanner of the type with which the present invention is concerned continuously samples the potential on each terminal in sequence and transmits information to the system controller only when a busy potential is encountered. The scanner sweeps continuously over its terminals as long as no terminal is encountered with a busy potential. When a terminal having a busy potential is found, the scanner stops and transmits information to the system controller identifying the terminal and, in turn, the portion of the system represented by the terminal. The scanner remains on a busy terminal at which it has stopped until it receives a START signal from the controller signifying that the information has been satisfactorily received and registered. The scanner leaves the terminal and resumes its active scanning upon the receipt of this signal.

The number of terminals that may be served by a single scanner depends upon many factors, one of which is the scanner speed. When the number of terminals to be monitored exceeds the capabilities of a single scanner, the system designer is faced with the choices of obtaining a higher speed scanner or of utilizing a plurality of conventional speed scanners each of which is individual to a portion of the terminals to be scanned. Neither alternative is wholly satisfactory. Scanning equipment becomes increasingly expensive as its speed is increased, and therefore, in many instances, it becomes economically prohibitive to utilize a single scanner having the required speed. The use of a plurality of conventional speed scanners, each of which is individual to a portion of the terminals to be scanned, is undesirable since, in many instances, unless special and expensive precautions are taken, a sudden increase in system activity may result in busy signals being applied to the terminal groups unequally. Consequently, one scanner might be overloaded, from most of the resultant busy signals being applied to its terminals, while the remaining scanners would be relatively lightly loaded due to a relatively small increase of activity on their terminals.

It may be seen from the foregoing that the arrangement heretofore available for scanning a large number of terminals necessitates a choice between two alternatives, neither of which is entirely satisfactory. The first alternative requires the use of a single scanner having a speed sufficiently high to serve all the terminals to be monitored. This alternative is often undesirable since the cost of the scanner having the required speed may be economically prohibitive. The second alternative requires the use of separate scanners and separate terminal groups. The disadvantage of this alternative is that reliable system operation may not be maintained under certain adverse conditions of heavy load unless special precautions are taken to allocate the busy signals equally to all scanners.

It is therefore an object of the invention to provide improved scanning equipment.

It is a further object to provide improved equipment for scanning a relatively large number of terminals.

It is a further object to provide improved equipment for scanning terminals sufficiently numerous that, because of the increased costs associated with higher speed scanners, more than one conventional speed scanner must be used.

In accordance with my invention, I provide a pair of free-running nonsynchronous scanners of moderate speed to monitor a plurality of terminals whose quantity exceeds the capacity of either scanner by itself. The terminals are not subdivided into groups as is the case in the prior art; each scanner monitors all terminals. Equipment is provided so that both scanners do not concurrently stop at the same busy terminal. Once a first scanner reaches and stops at a busy terminal, the second scanner ignores the busy potential and passes by the terminal in the same manner as if it were idle.

In the disclosed exemplary embodiment of my invention, the scanners are shown as comprising a portion of an electronic telephone system having a plurality of operator positions, each of which has a plurality of keys that may be depressed, one at a time, by an operator in the furtherance of her call-serving functions. The function of the scanning equipment is to detect a key depression and to transmit signals to a system controller identifying the depressed key as well as the position at which it is located. A system of this type is shown in copending application of R. J. Jaeger, Jr. and A. E. Joel, Jr., Ser. No. 519,787, filed Jan. 10, 1966, now Pat. No. 3,484,560, issued Dec. 16, 1969. Reference is hereby made to the Jaeger-Joel application for a disclosure of the details of apparatus diagrammatically disclosed herein.

Each terminal to be scanned is individual to one of the operator positions and is energized in response to the depression of any key at its position. The potential of each terminal is normally ground (0 volts). This potential condition is hereinafter referred to as the "idle" state of the terminal and the position. The depression of a position key applies a positive 24-volt potential to its terminal. This potential is hereinafter referred to as a "busy" signal.

Both scanners run freely and nonsynchronously so long as no key is being depressed, i.e., all monitored terminals remain at ground potential. The subsequent depression of a position key applies a busy signal to its associated terminal. The first scanner to reach this terminal detects the busy potential, stops at the terminal, and transmits information to the system controller identifying the depressed key as well as the position at which it is located. A scanner leaves a busy terminal at which it is stopped only after it receives a START signal from the system controller indicating that the transmitted information has been satisfactorily received and registered.

Each scanner includes a source of driving signals which steps the scanner and enables it to test the potential state of each terminal in sequence. This signal source comprises a 40 kc. oscillator, a plural order binary counter driven by the oscillator, and a binary to 1-out-of-N translator whose input conductors are individually connected to the different counter orders. The translator has a plurality of output leads of which is individual to a different monitored terminal. The oscillator, the binary counter, and the translator together function in such a manner that the output terminals of the translator are cyclically energized in sequence with a positive enable potential. Each translator output conductor is normally at a zero volt (or ground) potential, except for the time when the enable potential is applied to it. Each terminal and, in turn, its associated position, is said to be scanned at the time its translator output conductor is enabled.

A control circuit is provided for each monitored terminal and, in turn, each operator position. Each control circuit includes two AND gates, one for each scanner, with a first input of each AND gate being connected to its associated scanner translator output conductor. This input may be referred to as the "enable" input since it receives an enable signal periodically from the translator of its scanner. Each AND gate has a second input which is interconnected with the keys of its position in such a manner that the input is normally at ground potential, but is driven positive whenever any key at its position is depressed. This second input is termed the "service request" (SR) input.

The application by a scanner of an enable potential to the enable input of an AND gate partially enables the gate and puts its conductive state under control of its SR input extending to the keys of its position. If no key is currently depressed, the SR input is not energized and the gate does not turn on and produce an output signal. However, if a key is currently depressed, its SR input is driven positive concurrently with its enable input. The gate turns on its response to the concurrent application of positive potentials to both inputs and produces an output signal which performs a number of functions, one of which is to apply an inhibit potential to the scanner oscillator to stop it and the scanner in its operative position associated with the position now being scanned. The output signal from the AND gate is also utilized to drive other circuits associated with the invention which transmit information to the system controller signifying the identity of the particular key at the position now being depressed.

Each of the two AND gates in each control circuit has a third input which is cross-connected to the output of the other AND gate for the same position. The output potential of each gate is normally +24 volts when the gate is off. This potential drops to approximately ground when the gate turns on. It has already been mentioned that AND gate can turn on only when all of its inputs are concurrently positive. The first scanner to scan a position at which a key is depressed is effective to turn its AND gate on since all three inputs of the AND gate are then high. This stops the scanner, as already mentioned. Since the output of each AND gate is cross-coupled to an input of the other AND gate for the same position, the turn-on of the first AND gate drives its output low to the third input to the other AND gate. Subsequently, when the other scanner advances to this position and energizes the enable input of the other AND gate, the gate cannot turn on since its third input is held at ground potential by the output of the AND gate which turned on when the first scanner reached the position. Since the second AND gate cannot turn on and inhibit the oscillator of the second scanner, the scanner treats this position in the same manner as it does a position at which no key is being depressed, i.e., it passes over this position and continues its active scanning of other positions.

Circuitry is also provided which prevents a single key depression from being served twice by the scanners. This is necessary since the SR potential resulting from a key depression may last several seconds or more, while a scanner may be able to serve this request in a few microseconds or so, depending upon the speed with which the START signal is returned from the system controller. Thus, it is necessary once a scanner leaves a position after having serviced it, that either the same or the other scanner does not subsequently stop at the position as a result of a continued depression of the same key. The circuitry which performs this function includes a flip-flop which changes from a reset to a set state in response to the reception of the START signal from the system controller following its reception of key information for a scanner. The setting of the flip-flop generates control potentials which prevent the same position from being scanned again after the scanner leaves the position so long as the same key depression persists. The flip-flop is subsequently reset when the key is released. This restores the control circuit to normal and prepares it for the serving of subsequent key depressions.

The two scanners together operating in this manner eliminate the need for a higher speed scanner and permit a larger number of terminals to be scanned than could be accomplished by either scanner alone. The two scanners serve a common group of terminals; they do not interfere with each other; and they eliminate the disadvantages heretofore concomitant to the use of plural scanners.

A feature of the invention is the provision of a pair of scanners for scanning a group of terminals common to both scanners with each scanner of the pair being operative to pass by an energized terminal currently being served by the other scanner.

A further feature is the provision of control circuits which are operative to prevent both scanners from concurrently stopping at the same energized terminal.

A further feature is the provision of a control circuit which is effective, after a stopped scanner moves off an energized terminal and resumes active scanning, for preventing either scanner from subsequently stopping at the same energized terminal for the duration of its continued energization.

A further feature of the invention is the provision of a control circuit which, upon the first scanning of an energized terminal, generates an inhibit signal for preventing the other scanner from subsequently stopping at the same energized terminal for the duration of its continued energization.

A further feature of the invention is the provision of a control circuit which causes an active scanner to pass by an energized terminal on which the other scanner of the pair has already stopped in connection with the current energization of the terminal.

A further feature of the invention is the provision in the control circuit of a pair of normally off gates individual to each terminal, with each gate of a pair being individual to one of the scanners, and with each scanner being effective to stop at an energized terminal and turn on its associated gate only if the other gate of the pair for the terminal has not already been turned on by the prior scanning of the terminal by the other scanner.

It is a further feature of the invention that neither scanner can stop at an energized terminal following the turn-on of one of its gates until both of its gates have been restored to an off condition.

Figure 3:
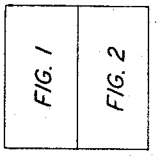
Figure 2:
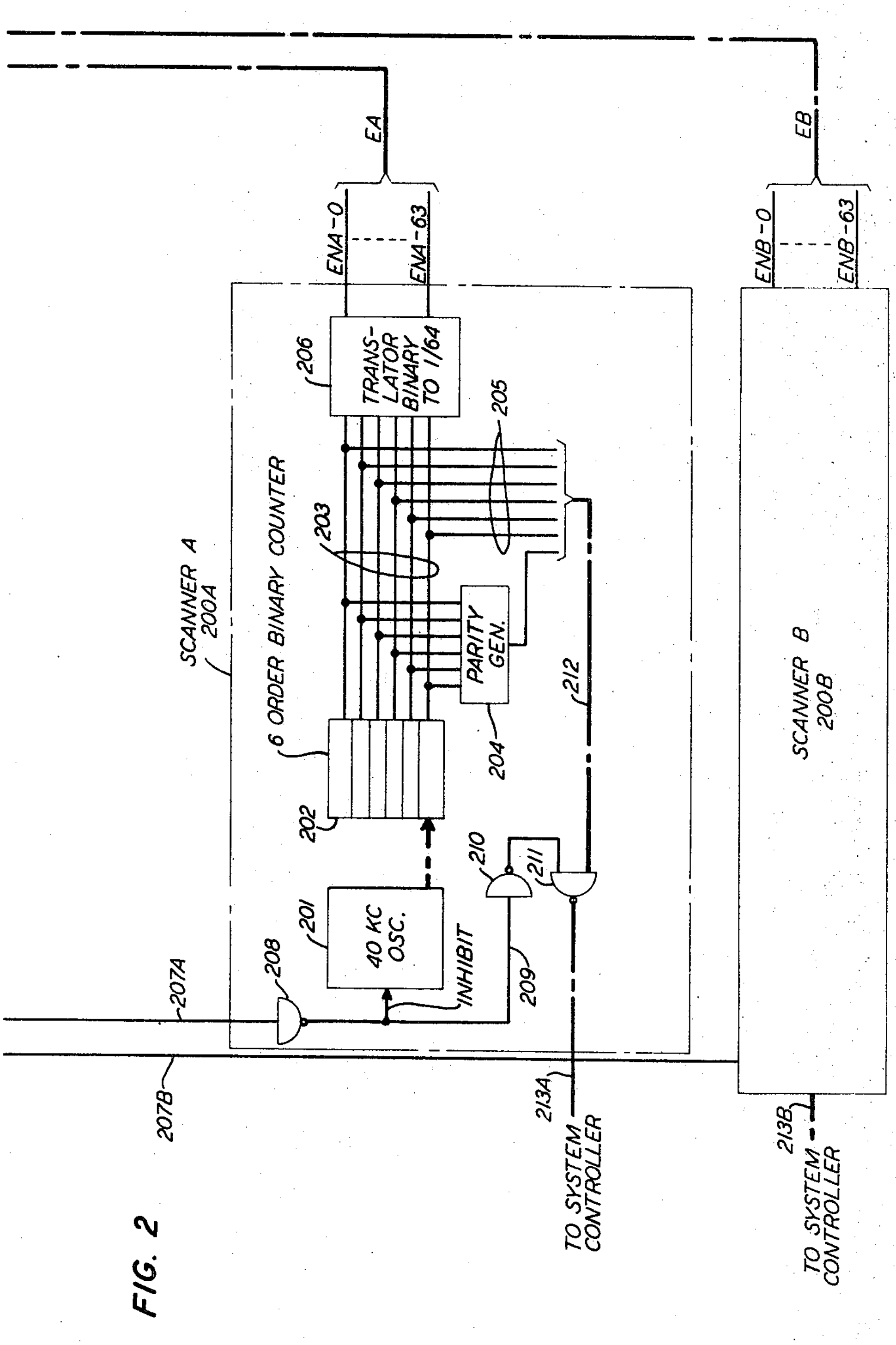

These and other objects and features of the invention may be better understood from a reading of the following description thereof, taken in conjunction with the drawings, in which FIGS. 1 and 2, when arranged as shown in the manner of FIG. 3, disclose the details of the invention.

FIG. 1 diagrammatically discloses 64 operator positions, elements 100–0 through 100–63. Each operator position contains a plurality of keys (not shown) which are depressable one at a time by the operator manning the position in the fulfillment of her call-serving functions. Each operator position, such as for example, operator position 63, has ten wires extending therefrom to the remainder of the circuitry shown on FIG. 1. The first nine of these wires are numerically designated 1 through 9 and extend into cable 101–63. The tenth conductor is designated SR–63. The apparatus at each operator position, as shown in detail in the Jaeger-Joel specification, includes a key matrix which, in response to the depression of a key, applies coded information of the 3-out-of-9 type to selected ones of conductors 1 through 9 to identify the key being depressed. Each of conductors 1 through 9 is normally held at a ground potential. The depression of any key applies a positive potential to a unique combination of three of the nine conductors. Conductor SR–63, which is normally at ground potential, is driven positive to signify a scanner service request whenever any key at its position is depressed.

FIG. 1 also shows a series of control circuits 105–0 through 105–63, each of which is individual to one of operator positions 100–0 through 100–63. The function of each control circuit is (1) to generate the signals required to inhibit the operation of the first scanner that applies an enable signal to the control circuit at the time a key is depressed at its associated operator position; (2) to develop the gating signals required to transmit to the system controller the 3-out-of-9 encoded information representing a depressed key at its position; (3) to generate the signals required to prevent a second scanner from stopping at the position at the time the position is being served by the other scanner; (4) to start up a stopped scanner so that it can resume active scanning once the system controller has received the encoded information identifying the depressed key; and (5) to generate the signals required to prevent a single key depression from being served more than once by the scanners.

Each control circuit includes a pair of enable leads, such as for example, leads ENA–63 and ENB–63 for control circuit 105–63. The ENA– conductor of each control circuit extends into cable EA extending to FIG. 2, while the ENB– conductor of each control circuit is connected to cable EB extending to FIG. 2.

FIG. 2 discloses a pair of scanners, 200A and 200B. Scanner 200A is shown in detail while scanner 200B is shown only diagrammatically. Each scanner comprises a normally free-running 40 kc. oscillator 201, whose output drives a 6-order binary counter 202. The output of each counter order is connected by one of conductors 203 to the input of the binary to 1-out-of-64 translator 206. The oscillator and the binary counter operate in such a manner that a unique 6-bit binary word is applied to the input of the translator for each operative position the counter may assume. The counter has six orders, and therefore counts 64 ($2^6$) input pulses before returning to initiate a new cycle. This permits it to apply 64 different binary words to the input of the translator. The translator has 64 output conductors, designated ENA–0 through ENA–63, each of which is connected via cable EA to a correspondingly designated input conductor of one of the 64 control circuits of FIG. 1. The successive 6-bit binary words received by the translator are each decoded into a 1-out-of-64 indication in such a manner that the output conductors ENA–0 through ENA–63 are energized sequentially with a positive 24-volt potential. This potential remains on each output conductor for the duration of time the 6-bit binary word representing the output conductor is applied to the input of the translator. When the counter advances one step under control of the oscillator, the binary input to the translator changes and the next output conductor is energized with a positive potential while the preceding output conductor returns to its normal ground potential.

A position is said to be scanned at the time its translator output conductor is energized with a positive enable potential. At this time, and at this time only, a key depression at the position may be detected in cooperation with the control circuits of FIG. 1 and the 3-out-of-9 encoded information representing the depressed key may be transmitted through the gates on the left side of FIG. 1 to the system controller.

Scanner 200B is comprised of elements identical to those of scanner 200A, and the outputs of scanner 200B comprise conductors ENB–0 through ENB–63, which are connected via cable EB to the corresponding input conductors of control circuits 0 through 63 of FIG. 1. In a similar manner, scanner B energizes with a positive potential its output conductors sequentially to provide a second source of enable signals to the control circuits of FIG. 1.

Each control circuit of FIG. 1 contains circuit elements individual to each scanner of FIG. 2, as well as circuit elements common to both scanners. The circuit elements individual to a scanner have either an "A" or a "B" as the last symbol of their designation, such as gate 113A, to indicate the scanner of FIG. 2 to which they are individual. The circuit elements common to both scanners are designated only numerically, such as for example, flip-flop 112.

The equipment shown for control circuit 63, which contains equipment identical to that for every other control circuit, includes a pair of normally off AND gates 110A and 110B. These AND gates, as well as every other AND gate shown on these figures bearing the same symbol operates in such a manner that it is normally off, with its output at a high potential, whenever one or more of its inputs are held at a ground potential. Each such AND gate can turn on only when all of its outputs are concurrently positive. At this time, the gate turns on and drives its output low.

The upper input of each of AND gates 110A and 110B is connected via resistor R2 to a source of negative potential and via resistor R1 to conductor SR–63 extending to operator position 63. As already mentioned, this conductor is driven from ground to a positive potential whenever any key at its position is depressed. These connections permit the upper input of each gate to remain at a negative potential when conductor SR–63 is at ground, and to assume a positive potential whenever conductor SR–63 is driven positive in response to a key depression.

The second input of AND gate 110A is connected to conductor ENA–63; the corresponding input of gate 110B is connected to conductor ENB–63. As already described, conductors ENA–63 and ENB–63 are driven from ground to a positive potential whenever scanners 200A and 200B, respectively, scan position 63. Flip-flop 112 is normally in a RESET state with its 0 output high (positive) extending to the third input of each AND gate. The lowermost input of each AND gate is cross-connected to the output of the other AND gate. Each AND gate is normally off, and thus its output normally applies a high to the lower input of its mate AND gate.

With respect to the foregoing, it may be seen that each of gates 110A and 110B can only turn on in the event that the following four conditions occur concurrently: (1) conductor SR–63 must be driven positive in response to a key depression; (2) the EN– lead for the gate must be driven positive by its scanner; (3) flip-flop 201 must be reset to produce a high on its 0 output; and (4) the other AND gate of the pair must be in an off state to apply a high to the lower input of the gate attempting to turn on. The normal state of flip-flop 112 is such that it is reset with its 0 output high extending to the third input of each gate. When this condition exists, it may be seen that either AND gate will turn on when it is scanned if a key at its position is then being depressed, provided that the other AND gate is currently off.

Let it be assumed that a key at position 63 is depressed when the position is scanned by scanner 200A. The key depression causes conductor SR–63 to go positive and apply a positive potential to the upper input of both AND gates 110A and 110B. Scanner 200A applies a positive potential to the ENA–63 input of gate 110A. The third input of this gate is high from the 0 output of the flip-flop and the fourth input of the gate is high from the output of gate 110B, which is assumed to be off. Thus, all four inputs to gate 110A are concurrently high, and it therefore turns on and drives its output low. The low on its output is applied via the cross-connection to the lower input of gate 110B to prevent this gate from turning on when scanner 200B subsequently scans this position during the same key depression.

The low on the output of gate 110A is inverted by gate 109A and applied as a high to the lower input of noninverting OR gate 106A. This gate operates in such a manner that its output is low whenever all of its inputs are low. The application of a high to any one of its inputs causes the high to be applied therethrough to conductor 207A. The high now on its input from gate 109A causes a high to appear on conductor 207A to turn on gate 208 and produce a low on its output. This low is connected to the inhibit input of oscillator 201 to stop it and the counter in their current operative position to signify the identity of the operator position now being scanned, i.e., position 63. The stopping of the oscillator maintains the positive potential on conductor ENA–63 as long as the oscillator remains inhibited.

The low from the output of gate 208 is applied over conductor 209, inverted by gate 210 and applied to the upper input of each of AND gates 211. The other input of each gate in this series of AND gates, in which there is a separate gate for each conductor in cable 212, receives over cable 212 the 6-bit binary word indicative of the present position of the counter. Parity generator 204 also receives the same binary word and generates parity information, which is also applied over cable 212. Thus, the high potential on the upper input of gates 211 permits the gates connected to the conductors of cable 212 having binary "1's" to turn on and gate information over cable 213A to the system controller representing, in a 6-bit binary word plus parity, the current operative position of counter 202. Each binary word that may be generated by this counter is unique to one of the 64 operator positions, and thus the information now received by the system controller over cable 213A indicates the position on which scanner 200A has stopped.

The low from gate 110A drives the output of gate 109A high extending to the lower input of each of the nine AND gates 102–63 represented by the single gate symbol shown in FIG. 1. The lower input of three of the nine AND gates is currently driven high from the 3-out-of-9 encoded information identifying the depressed key at position 63. The three AND gates connected to the leads of cable 101–63 which are driven high have both of their inputs high, and therefore these three gates turn on at this time and apply a low to their associated OR gates 103–A in the series of nine OR gates 103A. These OR gates are of the noninverting type, and therefore the low on their inputs is propagated therethrough and over cable 104A to the system controller. The 3-out-of-9 information received by the system controller over cable 104A identifies the depressed key while the 6-bit binary word, plus parity, received over cable 213A identifies the position at which the key is located.

Many key depressions may persist for only 50 milliseconds or so during periods in which operators are busy.

Since the scanners are shared by many keys and many positions, it is necessary that a scanner remain stopped at a position having a depressed key only long enough to transmit the required key information to the system controller. Once this information is received, it is necessary that the scanner quickly resume active scanning so that no key depression will be lost. The circuitry of FIGS. 1 and 2 ensures that a scanner will not remain stopped indefinitely on a position while the operator thereat inadvertently maintains a key depressed beyond the time required for the system controller to receive the information identifying the key. Once the system controller has received from a scanner the information identifying a depressed key, it transmits a START signal over the appropriate one of conductors 108A or 108B to reactivate the scanner and move it off the terminal of the position on which it is stopped.

Thus, after system controller receives the information identifying the depressed key at position 63, it transmits a positive START pulse over conductor 108A extending to the lower input of AND gate 113A. The upper input of this gate is high at this time from conductor ENA–63 and scanner 200A. Gate 113A now turns on and drives its output low to the S input of flip-flop 112. The negative-going signal to the S terminal switches the flip-flop to its SET state in which its 0 output is driven low. The low on the 0 output of the flip-flop is applied to the third input of gate 110A to turn it off. The turn-off of this gate drives its output high and the output of gate 109A low. This low is propagated through noninverting OR gate 106A to conductor 207A, where it causes the output of gate 208 to go high and remove the inhibit potential from the oscillator 201. The oscillator now starts up and causes scanner 200A to resume active scanning. The turn-off of gate 110A also, by means of gate 109A, disables the series of gates 102–63 so that the 3-out-of-9 encoded key information on conductor 101–63 cannot be transmitted to the system controller even though the key at position 63 may remain depressed.

Flip-flop 112 remains in a SET state so long as the key at position 63 remains depressed and applies a low from its 0 terminal to both of AND gates 110A and 110B. The low to the third input of both of these AND gates prevents either of them from turning on when conductors ENA–63 and ENB–63 are subsequently energized by scanners 200A and 200B, respectively. Control circuit 63 remains in this state so long as the operator maintains the same key depressed at her position. This prevents either scanner from stopping at the position and retransmitting the same information to the system controller. However, once the operator releases the key, the positive potential is removed from conductor SR–63. This permits the negative potential to be applied through resistor R2 to the R terminal of the flip-flop. This switches the flip-flop to its RESET state in which its 0 output is high. This high is extended to the AND gates 110A and 110B to restore control circuit 63 to its original state for the detection of subsequent key depressions at position 63.

The preceding has described the manner in which the circuitry of FIGS. 1 and 2 would operate to gate key information to the system controller when operator position 63 is scanned by scanner 200A. The operation of the circuit, in the event that scanner 200B had served this key depression, would be similar to that already described. The only difference would be that, in this case, the gates on FIG. 1 having the letter "B" as the last portion of their designation would operate in the same manner as did the A gates for the preceding description. Thus, for example, gate 110B would turn on and, via gates 109B, 102B–63, and 103B, would gate 3-out-of-9 key information to the system controller. Also, scanner 200B would be inhibited momentarily by control signals from control circuit 63 and, in so doing, would transmit over cable 213B the information signifying the operator position having the depressed key. The operation of the circuit of FIGS. 1 and 2 for the depression of a key at any other position would be similar to that already described for the depression of a key at position 63.

It is to be understood that the above-described arrangements are but illustrative of the application of the principles of the invention. Numerous other arrangements may be devised by those skilled in the art without departing from the spirit and scope of the invention.

What is claimed is:

1. In combination, a plurality of terminals, a pair of free-running scanners each of which is independently operable to scan each of said terminals, means for energizing any selected one of said terminals, means responsive to said energization for stopping at said selected terminal the first scanner to scan it subsequent to its energization, and control means responsive to said stopping and effective while said selected terminal remains in an energized state for preventing the other scanner of said pair from concurrently stopping at said selected terminal.

2. The invention of claim 1 in combination with means subsequently effective for applying a start signal to said control means to move said stopped scanner off said selected terminal to cause it to resume active scanning, and means responsive to the application of said start signal for preventing either scanner from subsequently stopping at said selected terminal for the duration of its continued energization.

3. The invention of claim 1 in which said means for stopping includes means responsive to said scanning of said selected terminal by said first scanner subsequent to said energization for generating an inhibit signal, and means responsive to the generation of said inhibit signal for applying said signal to said first scanner to stop it on said selected terminal.

4. The invention of claim 3 in which said means for preventing comprises means effective upon the generation of said inhibit signal for preventing the other scanner from stopping at said terminal for the duration of the continued energization of said terminal.

5. The invention of claim 4 in combination with means for subsequently terminating said inhibit signal to cause said first scanner to leave said energized terminal and resume scanning, and means responsive to said last named means for preventing either of said scanners from subsequently stopping at said terminal for the duration of its continued energization.

6. The invention of claim 1 in which said control means includes a plurality of pairs of AND gates each pair of which is individual to one of said terminals, a first input on each of said gates, means effective upon the energization of any one of said terminals for applying a signal to the first input of both gates of the pair to which said one terminal is individual, a second input on each of said gates, a plurality of outputs on each of said scanners, means connecting the second input of each gate of a pair to an individual output on a different one of said scanners, each of said outputs of a scanner also being individual to a gate in a different one of said pairs, means in each of said scanners effective for scanning a terminal by applying an enable potential to the one of its outputs that is connected to a gate in the pair individual to the terminal, each of said gates being effective to turn on and generate an output signal upon the concurrent application of signals to its first and second inputs, means responsive to the turn-on of a gate for stopping the scanner connected to the second input of the gate, a third input on each of said gates, means cross-connecting the output of each gate of a pair to the third input of the other gate for the pair, said cross-connections being effective upon the turn-on of the first gate of a pair for applying an inhibit potential to the third input of the other gate in the pair and thereby inhibit the subsequent turn on of said other gate by said other scanner as long as said first gate remains in an ON state.

7. The invention of claim 6 in combination with, a fourth input on each of said gates, a flip-flop individual to each of said terminals, means connecting an output of said flip-flop to the fourth input of both gates of the pair associated with its terminal, means for applying a start signal to said flip-flop to switch it to a SET state in which its output is driven low to turn off any one of its gates currently in an ON state, responsive to said turn-off for causing a stopped scanner to leave said energized terminal, and means for holding said flip-flop in a SET state as long as a key at a position individual to said energized terminal is depressed, said last named means being effective to prevent said energized terminal from being scanned by either scanner for the duration of time said key remains depressed.

8. In combination, a plurality of terminals, a first and a second free-running scanner each of which is independently operable to scan all of said terminals one terminal at a time, means for concurrently energizing selected ones of said terminals, means responsive to said energization for stopping only one scanner at a time on any single energized terminal, means responsive to the stopping of said one scanner on an energized terminal for enabling the other scanner to pass over said terminal as it remains in an energized state and to stop at the next energized terminal it encounters.

9. In combination, a plurality of terminals, means for energizing any selected one of said terminals, an individual pair of gates associated with each of said terminals, a first and a second input on each of said gates; means effective upon the energization of any terminal for applying a signal to the first input on both of its associated gates, a first scanner effective for applying an enable signal to the second input of one of said gates associated with each terminal sequentially terminal by terminal, a second scanner nonsynchroonusly operable with said first scanner for applying an enable signal to the second input of the other one of said gates associated with each terminal sequentially terminal by terminal, the first and second inputs of said gates being effective upon the energization of a terminal for turning on the first one of its associated gates which subsequently receive an enable signal from a scanner, and means responsive to the turn-on of said gate for stopping its associated scanner on said terminal.

10. The invention of claim 9 in combination with a third input on each of said gates, and means effective upon the turn-on of one of said gates for applying an inhibit potential to the third input of the other gate of the same pair for preventing the other scanner from stopping at said energized terminal for the duration of its continued energization.

11. The invention of claim 10 in combination with means for receiving a START signal, means responsive to the reception of a START signal for effecting the turn-off of the one of said gates that is currently in an ON state, and means responsive to the turn-off of said gate to cause its associated scanner to resume active scanning.

12. The invention of claim 11 in combination with means additionally responsive to the reception of said START signal for preventing either scanner from stopping at said terminal for the duration of the energization of said terminal.

13. The invention of claim 12 in which said means for preventing either scanner from stopping includes, a normally reset flip-flop for each terminal, means for switching said flip-flop to a first conductive state upon the reception of said START signal, a fourth input to each of said gates, means interconnecting an output of each flip-flop with the fourth input for both gates of the pair associated with its terminal, said interconnection being effective to turn off a gate in an ON state whenever its flip-flop assumes a first conductive state, and means for switching said flip-flop to a second conductive state upon the cessation of the energization of said terminal, said flip-flop being effective when in its second conductive state for partially enabling both of its gates and putting their state under control of the first three inputs on the gates.

14. The invention of claim 13 in combination with additional gate circuits individual to each terminal, means including said additional gate circuits responsive to the turn-on of one of the gates for its terminal for generating information pertaining to said terminal for the duration of time the scanner remains stopped at said terminal.

15. In combination, a plurality of terminals, means for energizing any selected one of said terminals, an individual pair of gates associated with each of said terminals, means effective upon the energization of any selected one of said terminals for applying a service request signal to both of its associated gates, a first scanner effective for applying an enable signal to one of the gates associated with each of said terminals sequentially terminal by terminal, a second scanner nonsynchronously operable with respect to said first scanner for applying an enable signal to the others of said gates associated with each of said terminals sequentially terminal by terminal, each of said gates of a pair being effective upon the receipt of a service request signal for turning on the first gate of the pair that subsequently receives an enable signal, and means responsive to the turn on of the first gate of a pair for stopping the scanner associated with said first gate on the energized terminal to which said first gate is individual.

16. The invention of claim 15 in combination with means responsive to the turn on of said first gate for preventing the other scanner from concurrently stopping on said energized terminal.

17. The invention of claim 16 in combination with means subsequently effective for applying a start signal to move said stopped scanner off said energized terminal to cause it to resume active scanning, and means responsive to the application of said start signal for preventing either scanner from subsequently stopping at said terminal for the duration of its continued energization.

References Cited

UNITED STATES PATENTS

| | | |
|---|---|---|
| 1,294,285 | 2/1919 | Lorimer et al. |
| 1,270,326 | 6/1918 | Reynolds. |
| 3,349,188 | 10/1967 | Stirling et al. |

WILLIAM C. COOPER, Primary Examiner